(12) United States Patent
Rodgers

(10) Patent No.: US 6,332,420 B1
(45) Date of Patent: Dec. 25, 2001

(54) SAIL OF ONE PIECE THREE DIMENSIONAL FABRIC

(75) Inventor: John H. Rodgers, Carson City, NV (US)

(73) Assignee: North Marine Group, Milford, CT (US)

(*) Notice: Subject to any disclaimer, the term of this patent is extended or adjusted under 35 U.S.C. 154(b) by 0 days.

(21) Appl. No.: 09/598,871

(22) Filed: Jun. 21, 2000

(51) Int. Cl.[7] .................................................. B63H 9/06

(52) U.S. Cl. ........................................................ 114/102.31

(58) Field of Search ........................................ 114/102.31

(56) References Cited

U.S. PATENT DOCUMENTS

| | | | | |
|---|---|---|---|---|
| 3,903,826 | * | 9/1975 | Andersen | 114/102.31 |
| 4,708,080 | * | 11/1987 | Conrad | 114/102.31 |
| 4,945,848 | * | 8/1990 | Linville | 114/102.31 |
| 5,097,784 | * | 3/1992 | Baudet | 114/102.31 |
| 6,260,497 | * | 7/2001 | Keire | 114/102.29 |

* cited by examiner

Primary Examiner—Sherman Basinger
(74) Attorney, Agent, or Firm—Pyle & Piontek (57) ABSTRACT

A sail is formed on a mold in a three dimensional fashion. The sail is a laminate having three corners. The sail includes two outer layers of film and an inner yarn structure. Yarns radiate from each corner of the sail and terminate at an edge opposite the corner. Additional secondary reinforcing elements may be added between the film layers.

9 Claims, 10 Drawing Sheets

SAIL OF ONE PIECE THREE DIMENSIONAL FABRIC

In the Baudet U.S. Pat. No. 5,097,784, a method is described for making a sail on mold having an adjustable profile or 3-D surface. A triangular sail is made by first applying a layer of film on the mold, applying individual adhesively coated yarns on the film with yarns extending from corner to corner in generally a curved path, and then applying a top layer of film. The film layers carry adhesive and are bonded together on the mold using heat and pressure. The resulting product is a three-dimensional, one-piece laminate having yarns which run along stress lines in the sail, generally in a curved fashion.

While molded sails of the above nature have been very successful and have been adopted by many racing sailors, there is a continuing need to provide improvements to these types of sails in terms of economy of manufacture, load handling, strength to weight ratio, and durability.

U.S. Pat. No. 5,172,647 discloses a triangular sail, in which the body of the sail is made from flat panels of film joined together. Reinforcing tapes or ribbons are applied on each side of the film body. On one side, the tapes extend radially outwardly from the head to the foot of the sail. On the other side of the film, tapes are applied to extend radially outwardly from the clew to the luff. The use of externally applied tapes to sails made of panels is also described in earlier patents, such as U.S. Pat. Nos. 4,593,639; 4,624,205; and 4,831,953.

The tapes described in the above references may be of woven fabric, or may be they are composed of a fabric or laminate having strong yarns running in a direction parallel to the length of the tape. These yarns are held together in a cross direction so that the yarns act as a flat unit. When stress is applied to a tape, one edge may be stressed more than the opposite edge, which is undesirable and inefficient. This is due to the fact that on one side of the tape, the yarns may be under tension while on the other side they will be in compression. As a result, the yarns in a tape do not act as efficiently to transmit loads as do individual yarns. Also, the tapes are flat and two-dimensional and are therefore, considered only suitable for application to a flat sail panel, with adjacent panels being connected by seams which extend through the body of the sail.

SUMMARY OF THE INVENTION

In accordance with the present invention, a sail is made by the method described in U.S. Pat. No. 5,097,784, with one primary difference being the layout pattern of the yarns. Individual yarns radiate from each corner of the sail with at least some of the yarns extending to and terminating at an opposite edge of the sail. It is believed that such yarn layout provides better handling of loads, as well as good durability, for example, when the sail is luffing. The yarns are laid on the mold in a 3-D fashion and follow the shape of the mold and the desired shape of the sail. At least some of the yarns may be said to be geodesic, in that they follow the shortest path between two points on a 3-D surface.

In addition to the above yarn configuration, additional or secondary load bearing elements may be introduced between the outer film layers prior to lamination. These include a layer of randomly applied individual fibers. Other potentially useful inner layers include a scrim, a woven fabric such as taffeta and the like.

DETAILED DESCRIPTION OF THE INVENTION

Figure 7:
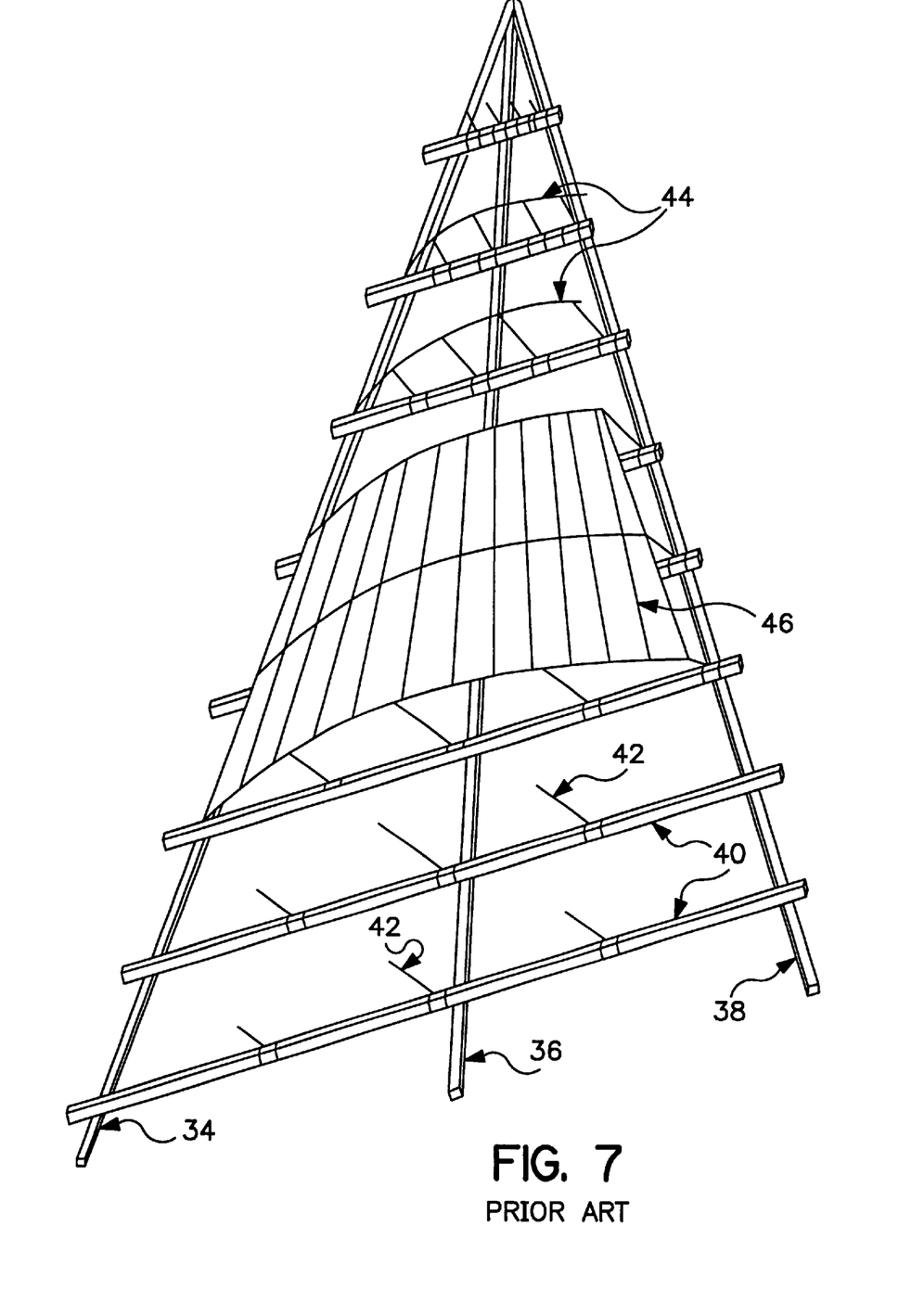
FIG. 7 is a perspective schematic view of the adjustable mold used to make the sail of the present invention.

The sail of the present invention is made on a mold having a 3-D surface, preferably a convex continuous adjustable surface, such as shown in FIG. 7, as described in U.S. Pat. No. 5,097,784, incorporated herein by reference.

The mold apparatus comprises a plurality of base support members 34, 36 and 38, which diverge from a common point in a triangular configuration. These support members are mounted in a fixed position. A plurality of transverse rail members 40 are mounted on and across the base members and are adjustably movable in parallel in a direction toward and away from apex of the base members, i.e., along the center line of the angle.

Each of the rails 40 carries a plurality of upright columns 42 which can be adjusted along various positions on the rail. Each of the columns 42 is preferably adjustable in height by a plurality of fluid driven devices to define a plurality of areas of support for a three dimensional profile. On the upper ends of each series of columns is secured a flexible flat member 44, similar to a batten, with each batten defining a crosswise curvature.

Mounted on the flexible members 44 are a plurality of upper profile members 46, which are flexible and contiguous together to define the three dimensional surface of the mold. These members may be made, for example, from reinforced rubber, or the sections may each comprise a tube covered with flexible plates and covered with a rubber blanket. As a result, the mold surface is substantially continuous and uninterrupted. The various supports are adjustable to accommodate sails of various shapes and sizes.

The molded, three dimensional sail of the present invention comprises a laminate of at least three layers. Preferably, the outer layers comprise continuous film layers, and the third layer is an array of yarns as described herein.

Figure 1:
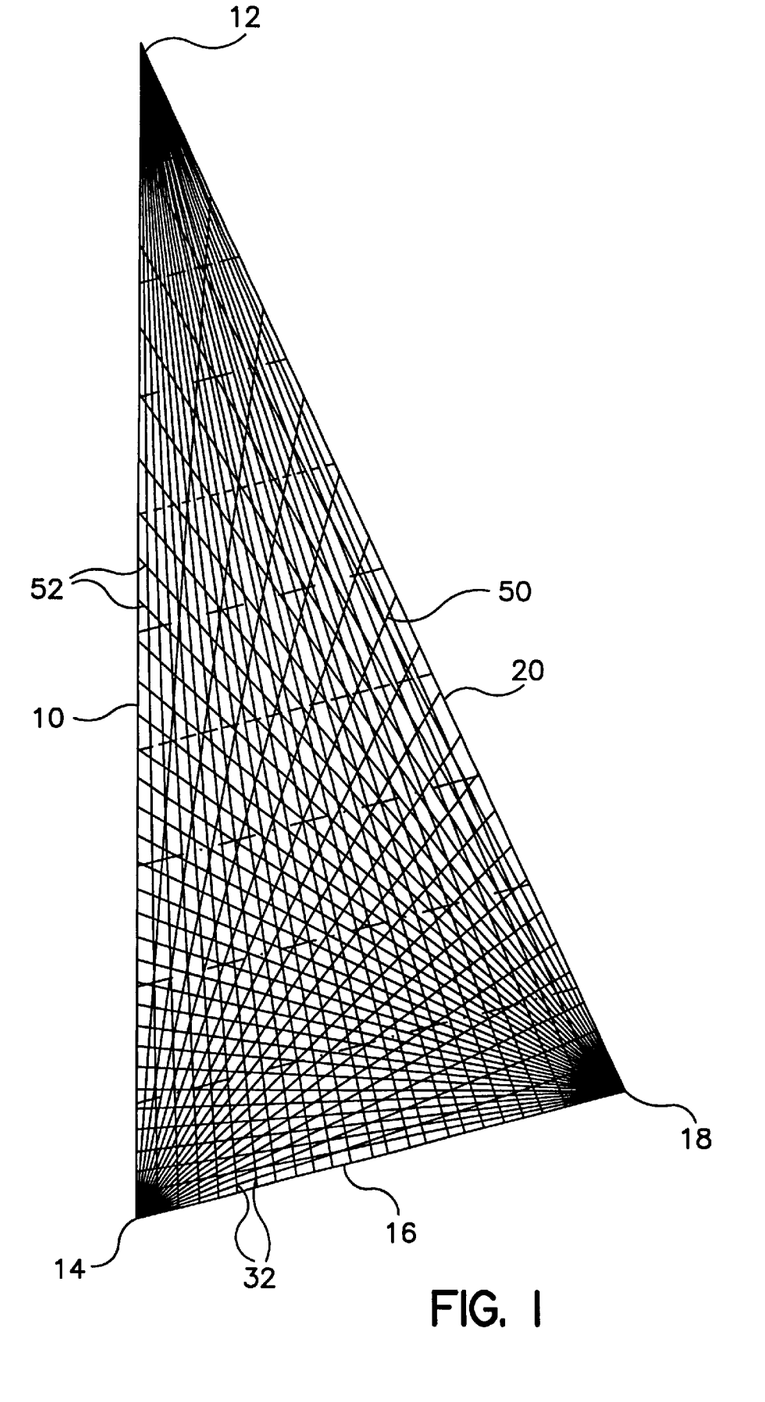
FIG. 1 is a plan view of the molded sail of the present invention.

As shown in FIG. 1, the triangular sail of the present invention comprises a luff 10 extending between the head 12 and the tack 14, a foot 16 between the tack and clew 18, and a leech 20 between the head and clew. The sail has a triangular shape when viewed in plan but also has a molded airfoil shape and draft. The layout described herein is applicable to any type of sail, including mainsails, foresails, or any pliant or flexible three dimensional fabric.

Figure 2:
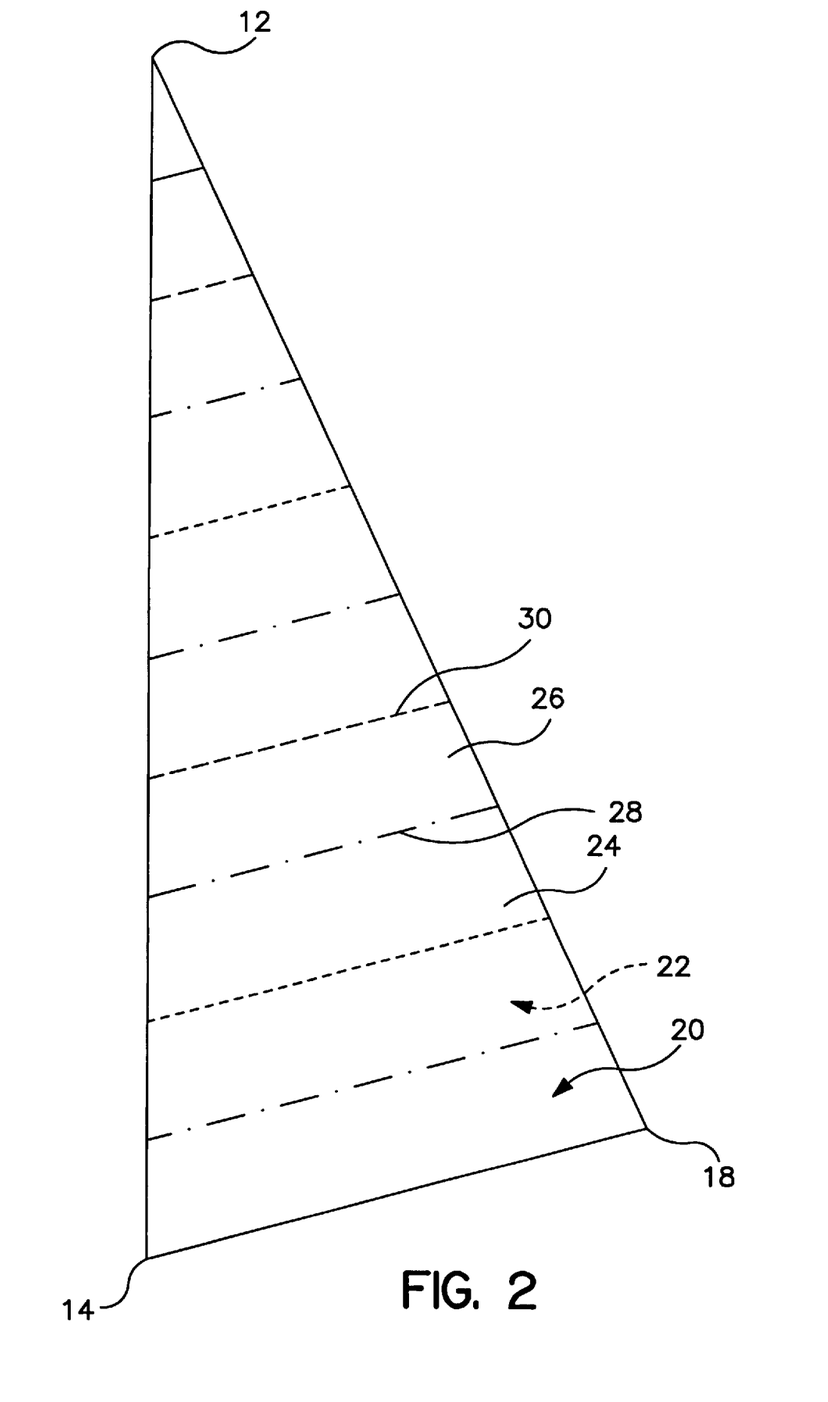
FIG. 2 is a plan view of two outer transparent film layers, showing arrangement of the film pieces.

FIG. 2 illustrates the layout of the two film layers 20 and 22. The film may be composed of any suitable polymer such as polyester, as well as any other films known to sailmaking. The yarn layers have been omitted for the sake of clarity.

By necessity, each film layer is formed from a number of pieces of film such as 24 and 26. The butt joints between the pieces in each layer 20 and 22 may be offset or spaced, as shown at 28 for layer 20 and 30 for layer 22.

The sail is devoid of "panels" as the term is used in sailmaking, in that there are no joined seams extending through the fabric of the sail. While the film layers are impervious, they do not contribute substantially to the strength of the sail in comparison to the yarns. The edges of film pieces may be cut such that they can be butted together, or the edges may be overlapped. Adhesive tape may be applied to hold the pieces together during the lamination process.

The sail is made by the same method disclosed in the aforesaid U.S. Pat. No. 5,097,784. A first layer of continuous film is applied to the mold, and then three layers of overlapping yarns are applied as described herein. The yarns may be coated with adhesive prior to application. The yarns are applied in a 3-D fashion. The inwardly facing surfaces of the film layers may also be coated with adhesive.

The composition of the yarns can be selected from any suitable type known in the sailmaking industry, such as polyester, carbon, aramid, and the like, as well as materials sold under the trademarks Spectra, Dyntema, Certran, Vectran and Zylon. The denier and count of the yarns are dependent on the size of the sail and its intended use. The yarns comprise continuous filaments and may be twisted.

FIGS. 1, 3, 4 and 5 illustrate the general layout pattern of yarns in the sail.

Figure 3:
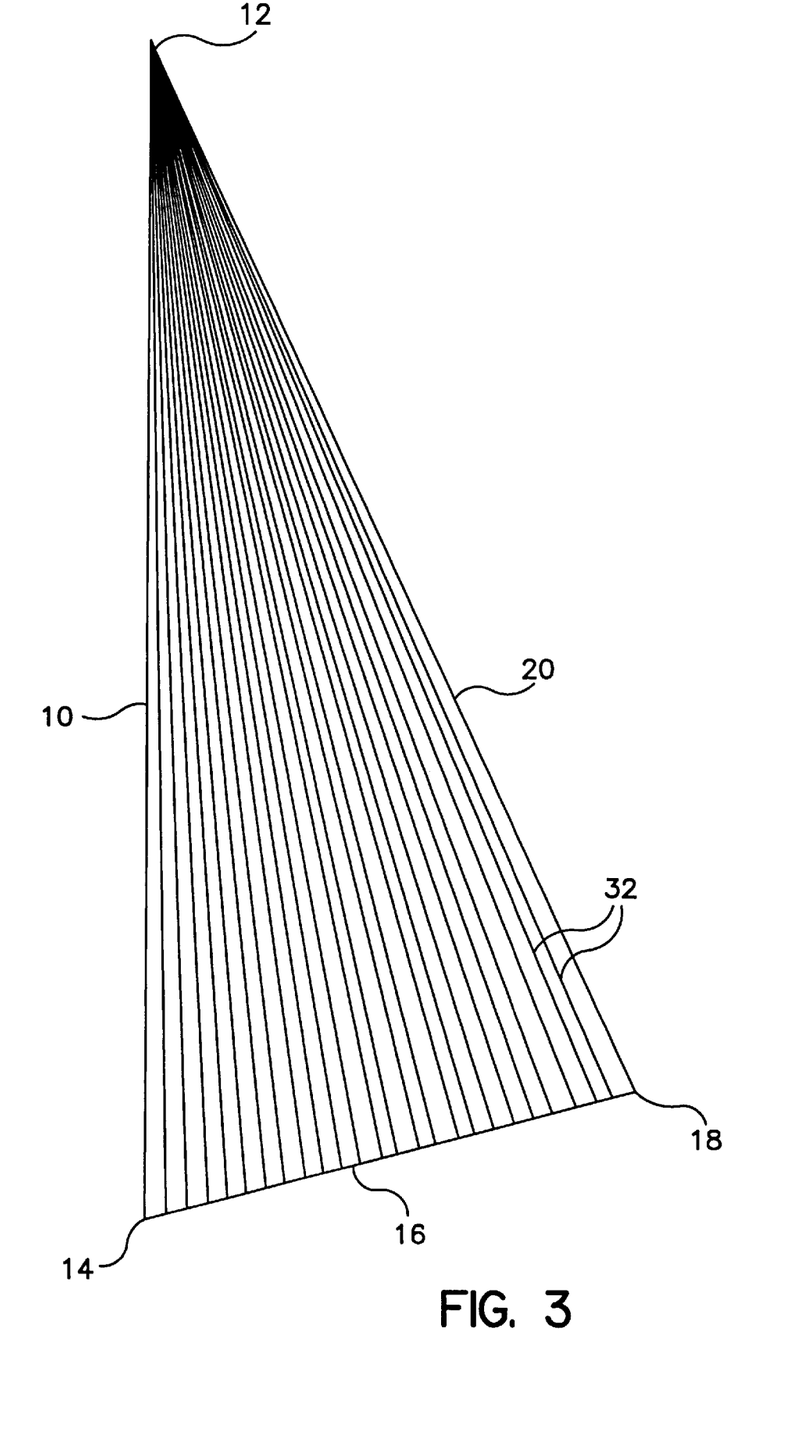
FIG. 3 is a plan view of the layout of fibers from the head to the foot of the sail.

As shown most clearly in FIG. 3, a first plurality of yarns 32 extend from a concentrated area at the head 12 of the sail and radiate outwardly, with all of the yarns terminating at the foot 16 in spaced fashion. While the yarns 32 are shown being spaced equally at the foot 16, other configurations can be envisioned. For example, a greater number of yarns may be applied in areas which receive more stress in the sail. Also, the yarns do not have to radiate exactly out of the apex of the corner, especially if patches are applied to the corners.

Figure 4:
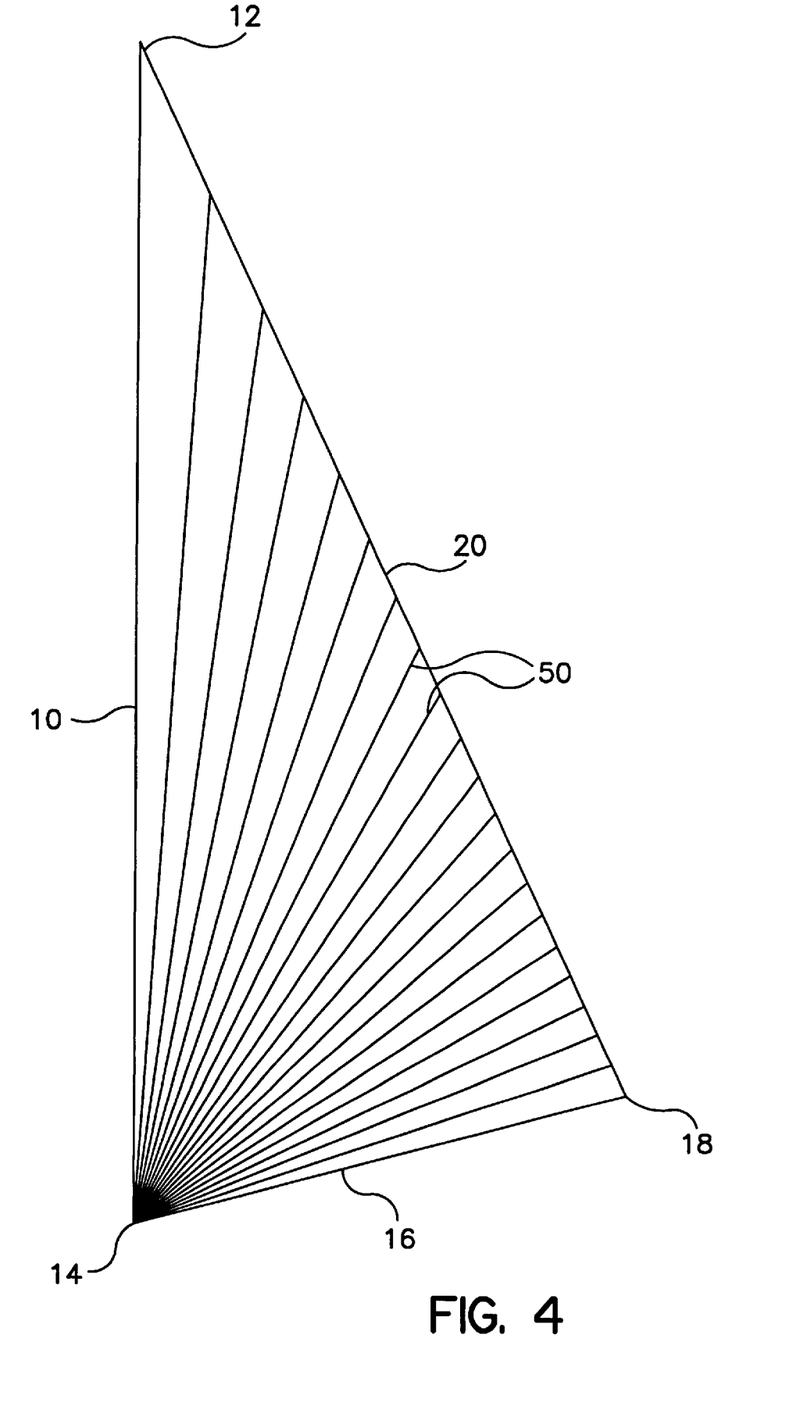
FIG. 4 is a plan view of the layout of the yarns from the tack or lower front corner to the rear edge of the sail.

As shown in FIG. 4, a second plurality of yarns 50 extend from a concentrated area of the tack 14 and radiate across the width of the sail and terminate at the leech 20.

Figure 5:
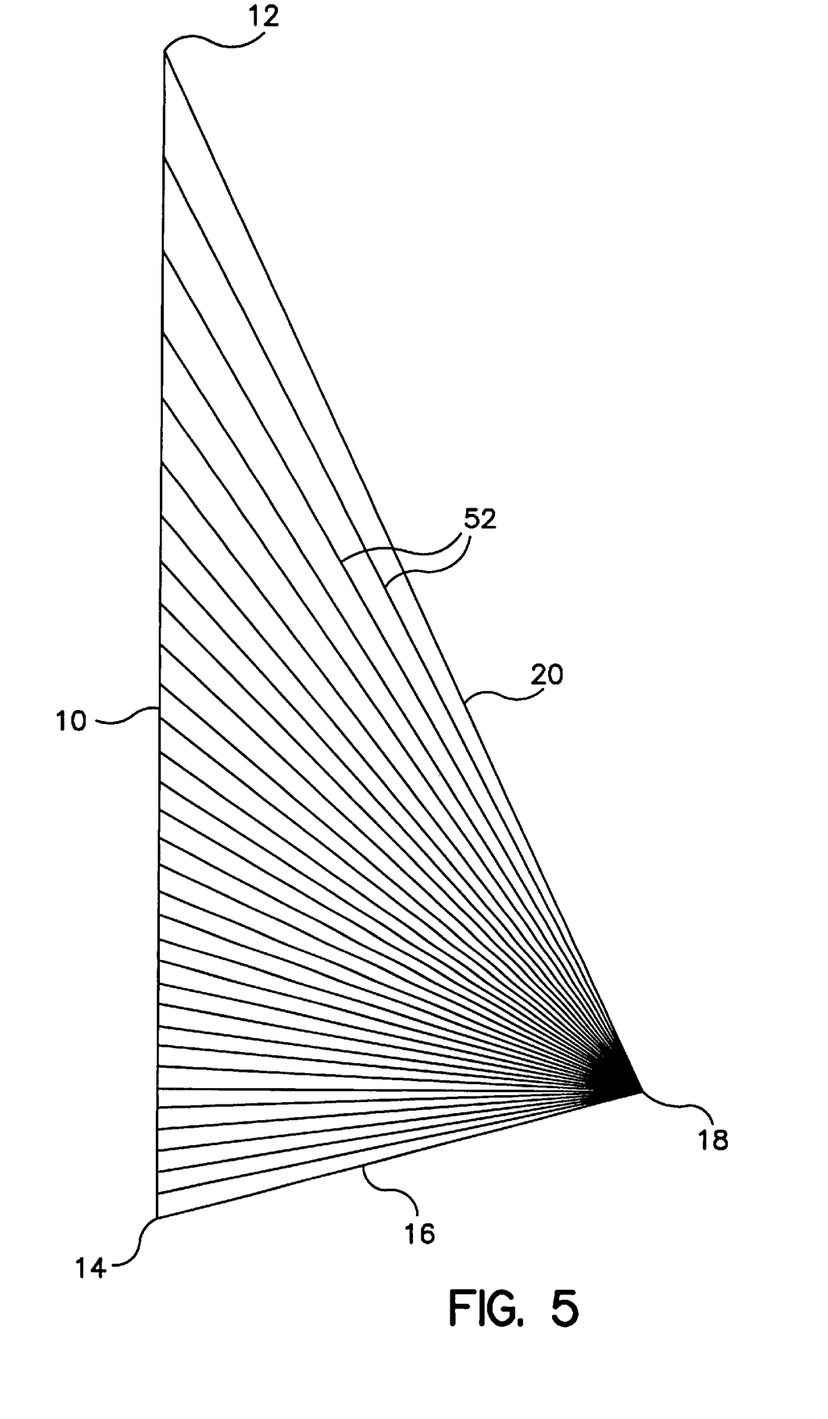
FIG. 5 is a plan view showing the layout of the yarns from the clew of the sail to the leading edge or luff.

As shown in FIG. 5, a third plurality of yarns 52 diverge outwardly from a concentrated area at the clew 18 in a radiating fashion and terminate at the luff 10.

The resulting yarn layout with the three separate diverging layers of yarns is shown in FIG. 1. In general terms, the sail is a one piece, molded triangular three dimensional sail having three corners and three edges opposed to the corners. A first 32, second 50, and third 52, plurality of yarns radiate from each of the corners in a radiating fashion and terminate at an opposite edge of the sail. In the present embodiment, the yarns are preferably substantially straight when the sail is viewed in plan and are preferably continuous along their length.

It will be noted that, contrary to prior teachings, none of the yarns connect corners of the sail. The yarns are substantially inextensible, and each set or array of yarns from each corner act independently of the other sets. Loads on the body of the sail caused by wind pressure are dissipated from the body into the corners by the shortest available route. As stated previously, the yarns in the present embodiment appear to be substantially straight when viewed in plan, but since they are applied on a 3-D surface of changing or complex curved shape, the yarns may not appear exactly straight when viewed in plan but may be considered as functionally straight.

Also, it is important that the yarns must be applied individually and not in the form of flat tapes or ribbons. If applied as tapes, the yarns or filaments within the tapes would not share loads equally.

While only a specific number of yarns are shown in the drawings hereof, the number of yarns, and as mentioned above, the denier of the yarns in each array may be varied to match the desired performance characteristics of the sail. Also, using the principles of the present invention, it is believed that lower weights of yarn will be required in comparison with the product described in the Baudet patent, in which many of the yarns are arranged in curved paths when the sail in viewed in plan.

Figure 6A:
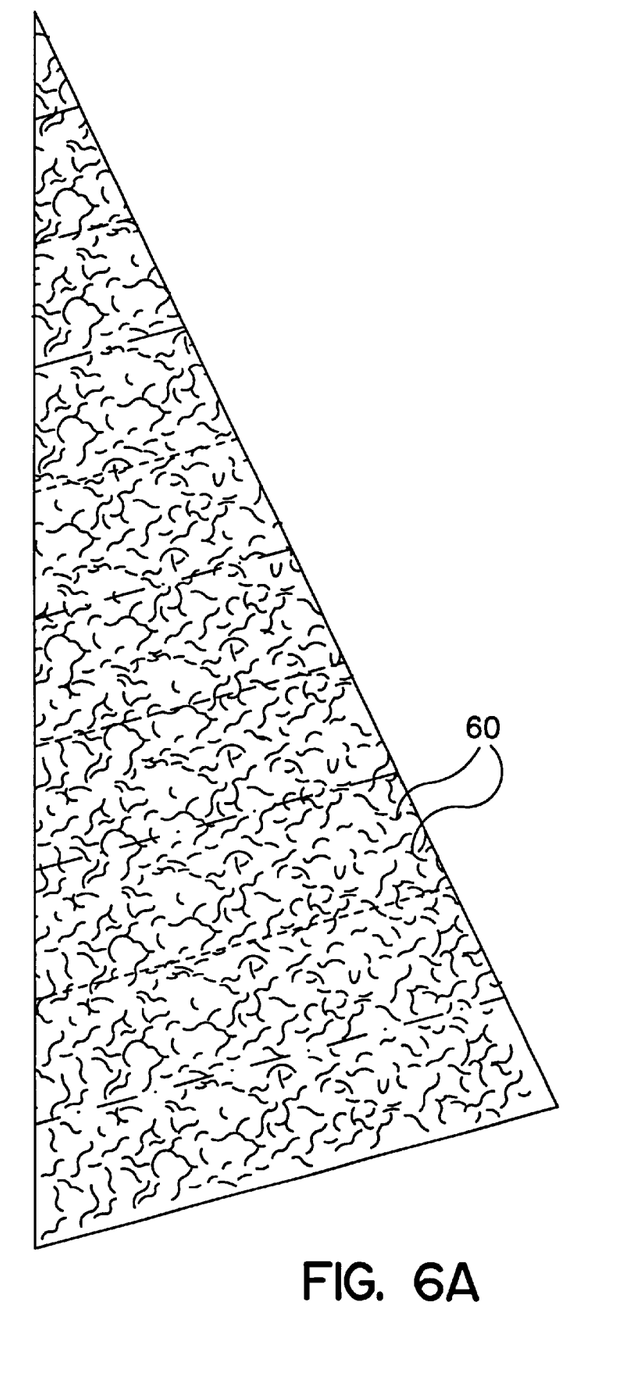
FIG. 6A is a plan view of the sail show in FIG. 1 with the addition of a layer of individual fibers.
Figure 6B:
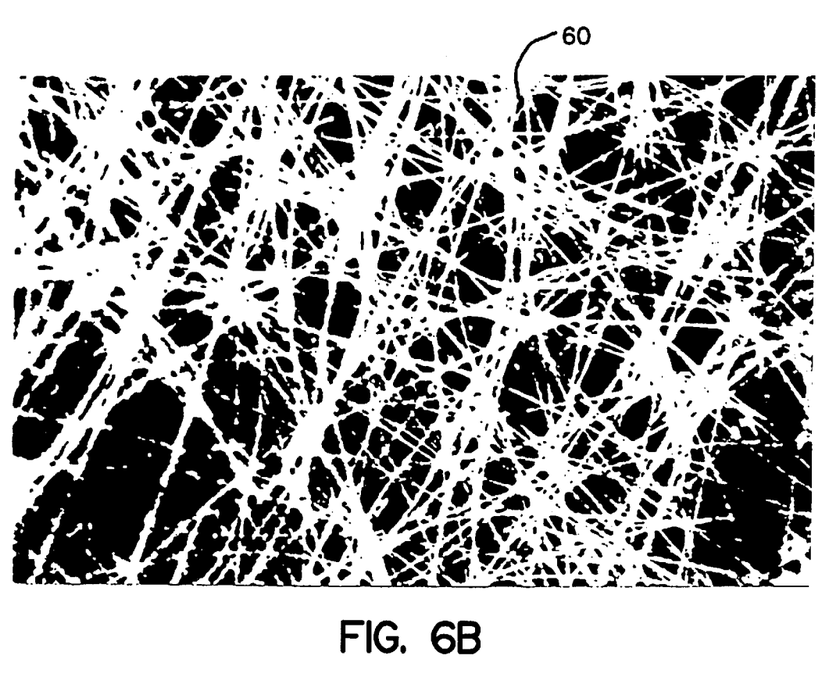
FIG. 6B is a magnified view of the fiber layer shown in FIG. 6A.

FIGS. 6A and 6B illustrate another embodiment of the present invention. The yarns, not shown in these Figures, are applied in the same tri-radial fashion as shown in FIG. 1. Prior to the application of the top film layer, however, a layer of chopped fibers 60 is applied over the yarns. The fibers may be applied as a uniform layer or may be more concentrated in selected areas. The fibers are applied in a fashion such that there is no orientation, with numerous fibers intersecting, and the fibers having a curved shape, as shown in FIGS. 6A and 6B.

Figure 8:
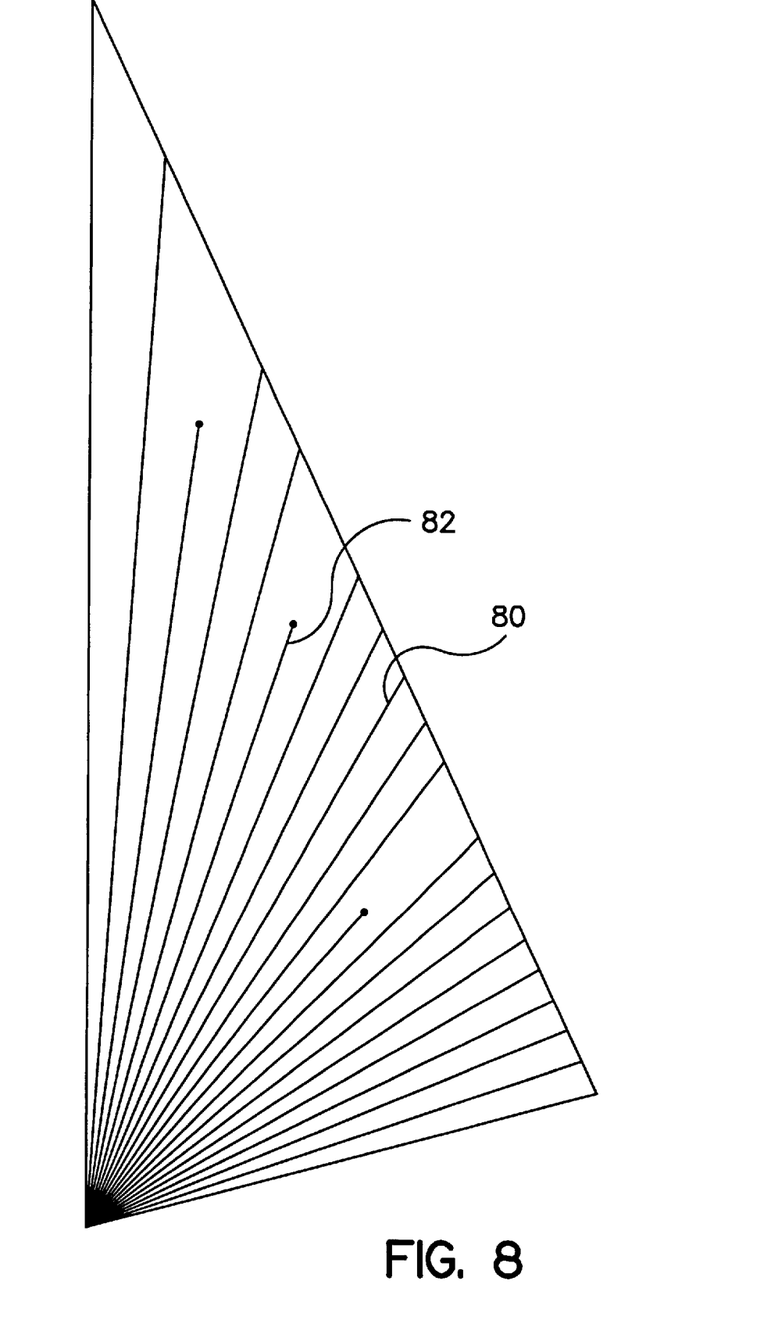
FIG. 8 is a plan view of another embodiment.

FIG. 8 illustrates another configuration of an array of yarns which can be employed from any of the corners. While it is essential that a substantial number of yarns extend from corner to an opposite edge, such as the yarns 80, other yarns, such as 82 may radiate out of a corner and terminate at a point short of the opposite of the total distance, for example from about 40 to about 85 percent of the distance. In this embodiment, it is preferable that the short yarns alternate with at least one of the longer yarns. Also, the length of the shorter yarns should preferably be varied so as not to create artificial lines of potential stress.

In the foregoing description, the sails as shown were substantially triangular in plan, in that the lines or edge s between corners are substantially straight lines, and the most effective deployment of the three radiating groups being as shown and described. Certain sails, however, do not have a triangular shape and may have portions which extend beyond a line d drawn between the corners.

Figure 9:
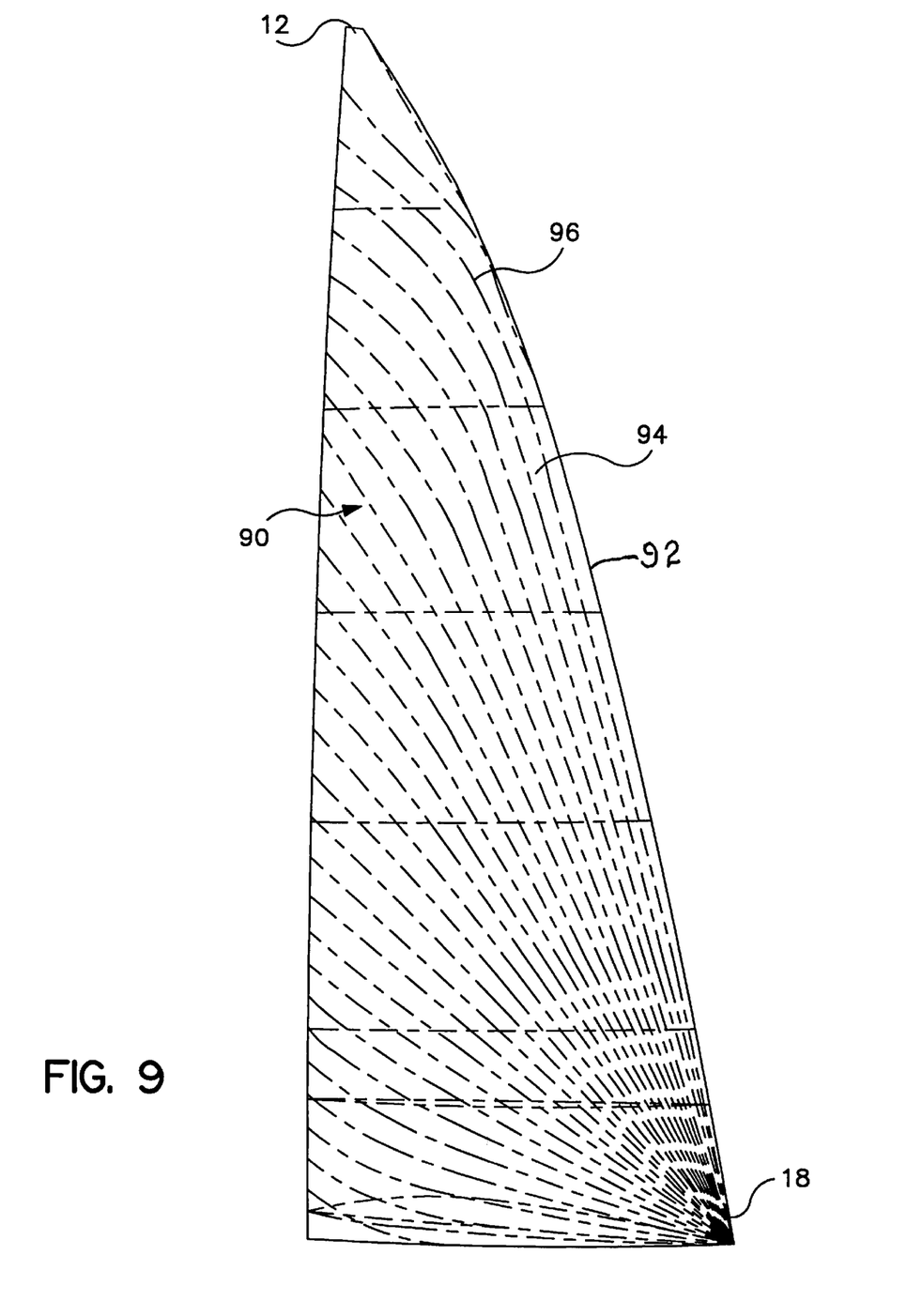
FIG. 9 illustrates a partial layout of yarns in a mainsail having a roach.

FIGS. 9 shows a mainsail 90 in which the rear edge or leech 92 is curved outwardly from the head to the clew and defines a relatively unsupported portion or roach 94. While the roach 94 is normally supported by a number of spaced horizontal battens, it is also necessary or desirable that laminates made in accordance with the present invention have some yarns which curve into and out of the area of the roach for added support, since yarns which radiate out of the head and the clew in a relatively straight fashion would normally not intersect this portion of the sail.

As shown in FIG. 9, yarns 96 radiating out of the clew 18 may be deposited so that they follow a curved trajectory out toward the leech 92 into the area of the roach 94 and then back toward the luff.

It will be appreciated that other portions of the sail, such as the foot, may be curved outwardly, in which case, the yarns can be curved into the additional area before extending toward the opposite edge.

Additional secondary reinforcing elements may be introduced. For example, one of the outer film layers may itself be a laminate, with the outer layer being film and the inner layer being a light weight cloth, such as a taffeta, a scrim, a nonwoven fabric such as a light weight spunbonded fabric of polypropylene or polyester, and the like.

What is claimed is:

1. A sail, said sail comprising a one piece triangular body comprising three corners and three edges opposed from said corners, said body comprising a pair of outer film layers and a yarn structure laminated between the film layers said yarn structure comprising a plurality of continuous primary load bearing yarns radiating out of each of the three corners in straight continuous lines to the edge, opposite the respective corner.

2. The sail of claim 1 wherein said sail is molded in a three dimensional shape.

3. The sail of claim 1 wherein the yarns from the corners are applied in successive layers.

4. The sail of claim 1 wherein said body is devoid of sail panels and seams extending through said body.

5. The sail of claim 1 additionally comprising a layer of chopped individual fibers between the outer film layers.

6. A molded sail, said sail comprising a molded one piece triangular flexible body, said body having three corners and three respective edges opposed to said corners, said body comprising a pair of outer film layers, and a plurality of individual yarns diverging outwardly from each corner and extending to the edge opposite to each corner, at least some of said yarns, when the sail is viewed in plan, being substantially straight, at least some of said yarns being curved on a geodesic.

7. The molded sail of claim 6 additionally comprising a plurality of yarns radiating from at least one corner toward an opposite edge, said yarns terminating in said body short of said edge.

8. The molded sail of claim 6 wherein each plurality of yarns extending from each corner act independently of each other.

9. The molded sail of claim 6 wherein said sail has a roach and at least some of said yarns curve into said roach.

* * * * *